(12) United States Patent
Scriven et al.

(10) Patent No.: US 8,235,401 B1
(45) Date of Patent: Aug. 7, 2012

(54) LEVER ASSIST FOR A TRANSPORT DOLLY

(76) Inventors: Rick Scriven, Stafford, VA (US); David L Caraffa, Erie, PA (US)

( * ) Notice: Subject to any disclaimer, the term of this patent is extended or adjusted under 35 U.S.C. 154(b) by 220 days.

(21) Appl. No.: 12/802,841

(22) Filed: Jun. 15, 2010

(51) Int. Cl.
 *B62B 1/00* (2006.01)
(52) U.S. Cl. .............. 280/47.27; 280/47.17; 280/47.18
(58) Field of Classification Search ............ 280/79.3, 280/79.11, 47.131, 47.28, 47.27, 47.29, 35, 280/43.1, 654, 47.17, 47.18; 414/444, 490, 414/434
See application file for complete search history.

(56) References Cited

U.S. PATENT DOCUMENTS

| | | | | |
|---|---|---|---|---|
| 1,539,933 | A * | 6/1925 | Britton | 280/47.29 |
| 2,546,876 | A * | 3/1951 | Sutherland | 280/47.27 |
| 3,035,727 | A * | 5/1962 | Turner | 414/444 |
| 3,157,411 | A * | 11/1964 | Rhodes | 280/47.29 |
| 3,712,496 | A * | 1/1973 | Miller | 414/490 |
| 4,318,655 | A * | 3/1982 | Svensson | 414/434 |
| 6,425,724 | B1 * | 7/2002 | Williamson | 414/490 |
| 7,731,205 | B2 * | 6/2010 | Wise | 280/47.131 |

* cited by examiner

*Primary Examiner* — Hau Phan
(74) *Attorney, Agent, or Firm* — Richard K Thomson

(57) ABSTRACT

The lever assist device which is attached to the axle of a transport dolly has a foot pedal which is spring biased to a first, vertical inactive position, may be engaged by the foot of a user to reduce the draw force required to rotate the loaded dolly onto its wheels for displacement.

7 Claims, 6 Drawing Sheets

LEVER ASSIST FOR A TRANSPORT DOLLY

BACKGROUND AND SUMMARY OF THE INVENTION

The present invention is directed to the field of storage racks. More particularly, the present invention is directed to a lever assist device which permits generally anyone to manipulate a dolly loaded with a storage rack into position to move regardless of the size of the load.

Racks have been developed to store, ship, and support heavy loads such as outboard motors for boats, and the like, which have the capability of being wheeled from place to place. One significant drawback of these racks is the problem of overcoming the inertia: tipping the loaded rack onto its wheels so that the rack and its load can be moved from place to place.

It is among the objects of the present invention to permit even a diminutive person (120 lb) with average strength to manipulate the storage rack using the lever assist into its tipped movable position, thereby enabling them to wheel the loaded cart from place to place.

The lever assist device of the present invention for enabling tilting of a transport dolly, supporting a particular load weight thereby requiring a particular draw force, to the ready position, includes a) a base plate assembly for securement to an axle of the transport dolly; b) a tilt plate securely affixed to a portion of the base plate; c) a lever arm pivotally secured to the base plate assembly and having a first end portion overlapping the tilt plate, a second end with a foot pedal; d) attachment means for securing the base plate assembly to the axle of the transport dolly; whereby the foot pedal may be engaged by a foot of the user to pivot the lever arm downwardly into contact with the tilt plate enabling rotation of the tilt plate and the transport dolly attached thereto about the axle of the transport dolly with a significantly reduced level of draw force for the specific load weight. An axle pin is attached to the base plate assembly, the lever arm being pivotally secured to the base plate assembly by means of the axle pin. Spring means is associated with the axle pin to bias the lever arm to a first non-operative position. Preferably, the spring means comprises a pair of coil springs wrapped around the axle pin operative between the tilt plate and the lever arm to bias the lever arm into the first non-operative position. The foot pedal is formed on the second end of the lever arm which is bent at a 45° relative to a remaining portion of the lever arm and engagable by the foot of the user to overcome the bias of the coil springs to bring the first end portion overlapping the tilt plate into contact with the tilt plate to allow application of a level of force up to the full weight of the user to assist in rotating the transport dolly about its axle to enable movement of the dolly and its load. Means to attach the base plate to the axle of the transport dolly includes two pair of aligned holes in the base plate assembly, two holes in the axle, and a pair of cotter pins which extend through the aligned holes on either side of the holes in the axle. The preferred version of the transport dolly features a pair of aligned axle shafts upon which wheels may alternatively be mounted. The more forward axle position is utilized when the center of gravity of the motor is rotated forward for allowing work to be performed thereon.

Various other features, advantages, and characteristics of the present invention will become apparent after a reading of the following detailed description.

BRIEF DESCRIPTION OF THE DRAWINGS

The preferred embodiment(s) of the present invention is/are described in conjunction with the associated drawings in which like features are indicated with like reference numerals and in which.

DETAILED DESCRIPTION OF THE PREFERRED EMBODIMENT(S)

Figure 1:
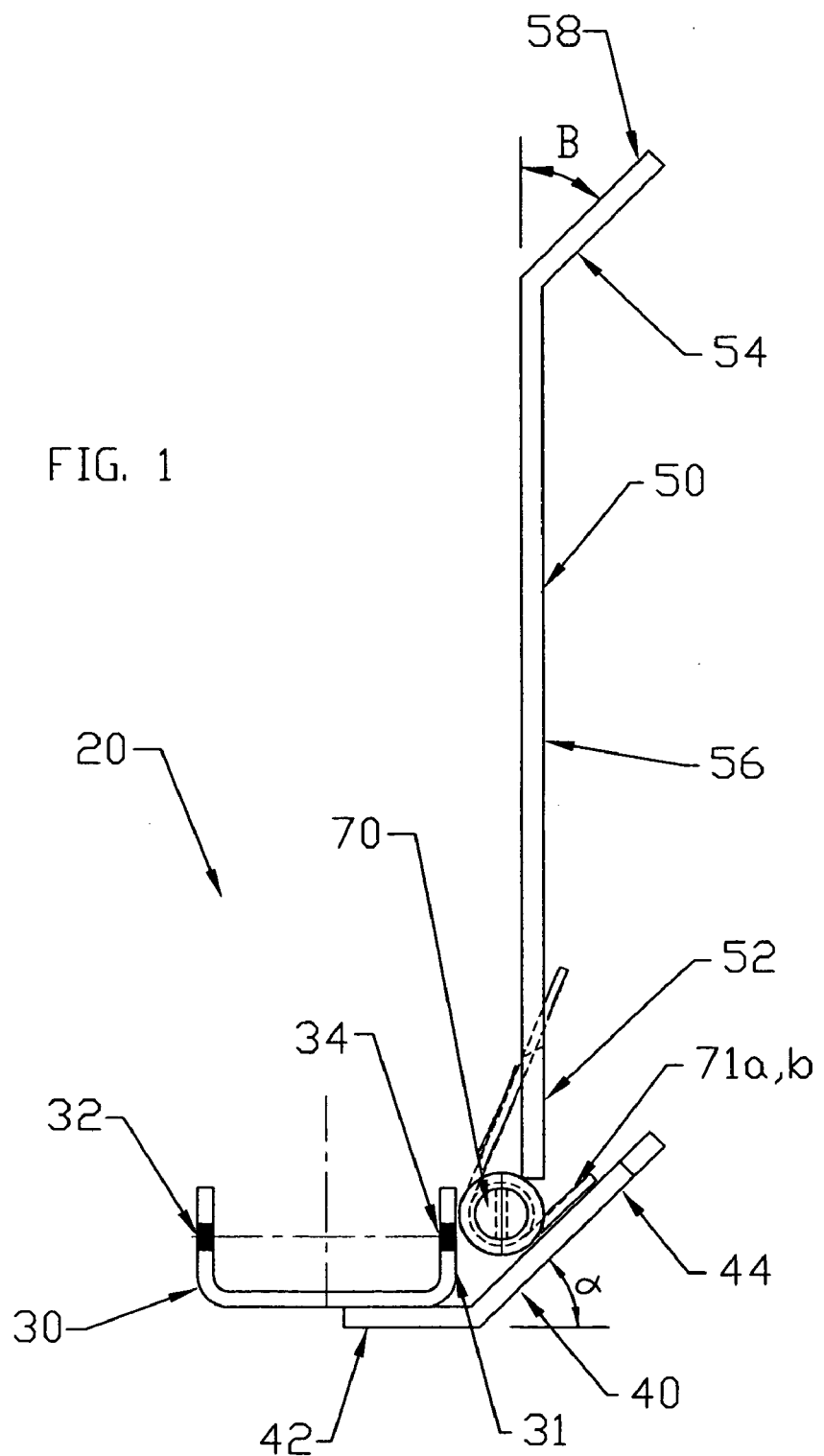
FIG. 1 is a side view of a first embodiment of the lever assist device of the present invention.
Figure 2:
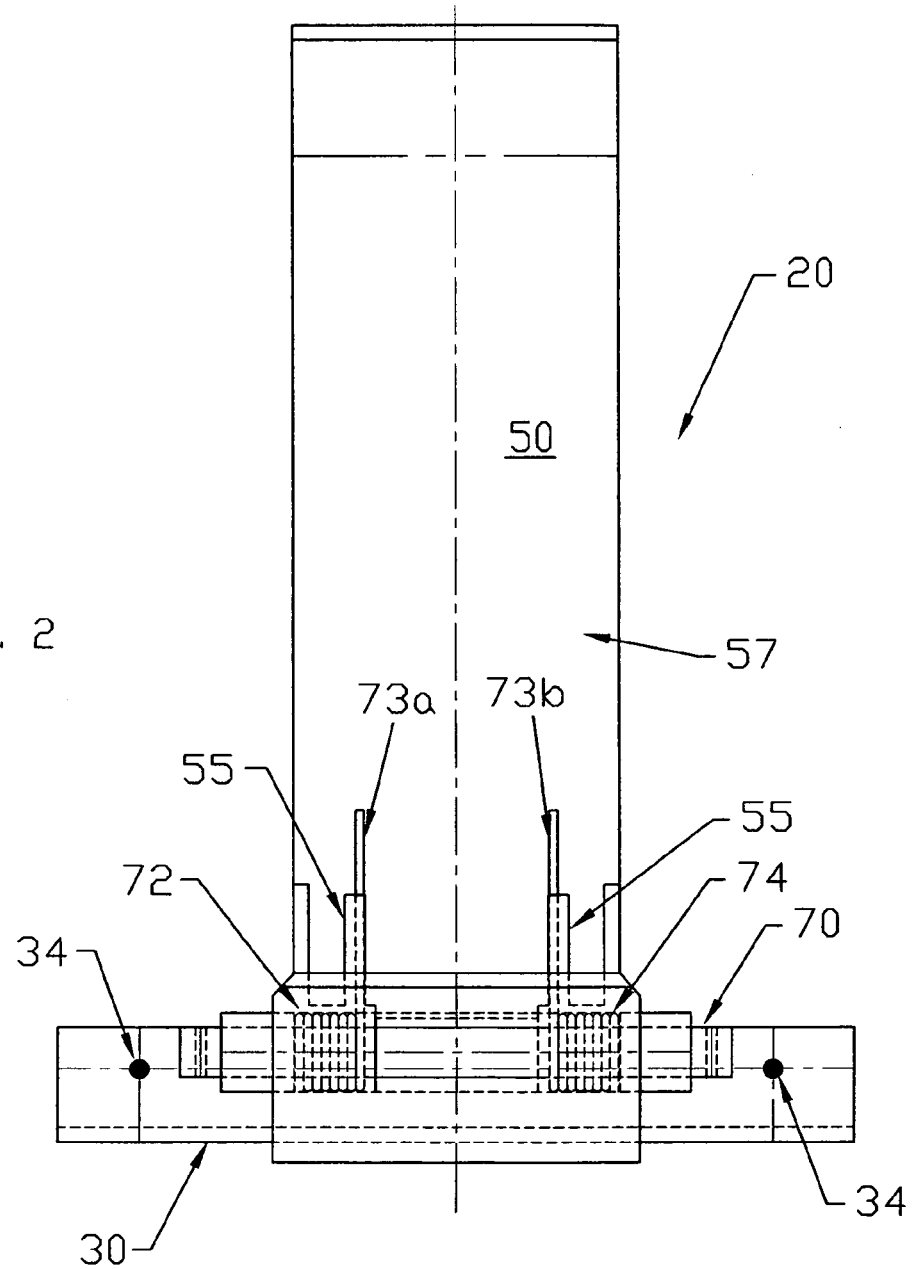
FIG. 2 is a rear view of the first embodiment.

A first embodiment of the lever assist device of the present invention is depicted in FIGS. 1-6 generally at 20. Lever assist device 20 comprises base plate assembly 30, a tilt plate 40 secured to base plate assembly 30 as by welding, and lever arm 50 pivotally mounted on base plate 30. Base plate assembly 30 is secured to the axles 13, 15 of the transport dolly 11 by cotter pins 60 (FIG. 5) which extend through aligned holes 32, 34 in base plate assembly 30 (FIG. 1) which are positioned on either side of axles 13, 15 (FIG. 3) having aligned holes through which cotter pins 60 extend.

Tilt plate 40 has a proximate end 42 which is welded to base plate assembly 30 and a distal end portion 44 which is bent at an angle α which is preferably 45° from the plane of proximate end 42. Lever arm 50 is mounted in such a way that first proximate end portion 52 overlaps distal end portion 44 of tilt plate 40. A section of second end portion 54 of lever arm 50 is bent at an angle β of 45° relative to the remaining portion 56 of lever arm 50 forming foot pedal 58. As a result of α and β being equal, when a force $F_1$ is administered by a user to foot pedal 58 (FIG. 6), foot pedal 58 will be in a horizontally extending position when first proximate end portion 52 comes in contact with distal end portion 44 of tilt plate 40. Thus a vertical force $F_1$, in conjunction with a sufficient horizontal draw force $F_2$ will cause the tipping of the transport dolly 11 and its load 17. The purpose of lever assist device 20 is to reduce the level of horizontal draw force $F_2$ that is required to rotate the dolly 11 and its load 17 onto wheels 19a, 19b (FIGS. 4, 5) for transport.

Axle pin 70 is attached to base plate 30 (in actuality, wedged between vertical surface 31 of base plate 30 and tilt plate 40 and spot welded to both) and has spring means in the form of first and second coil springs 72, 74 wrapped there around (FIG. 2) and with first arms 71a, 71b interacting with tilt plate 40 and second arms 73a, 73b extending through slots 55 in lever arm 50 engaging a rear surface 57 thereof to bias lever arm 50 to a first non-operative position (FIG. 1).

Figure 3:
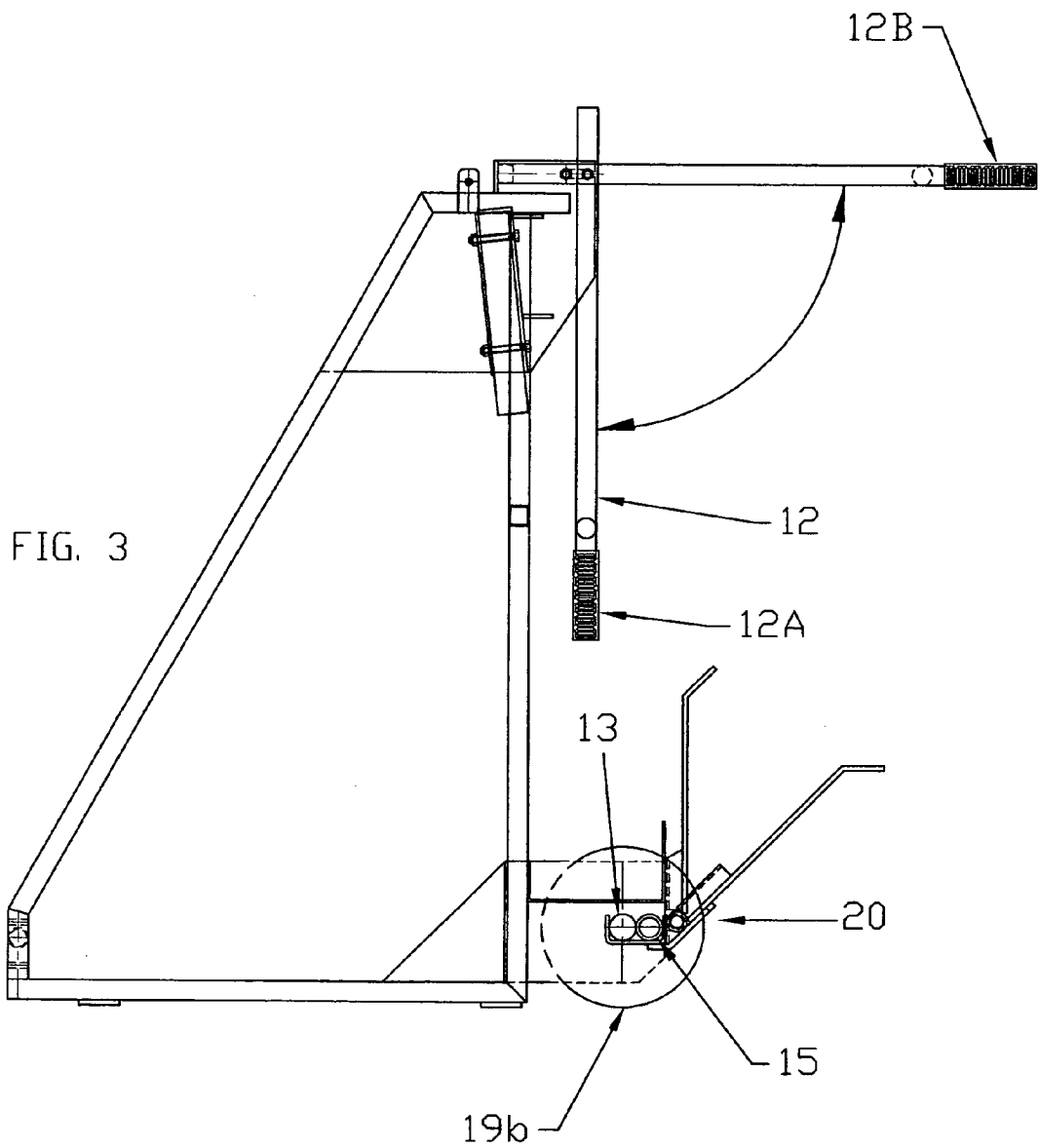
FIG. 3 is a side view of the first embodiment shown mounted on a transport dolly.
Figure 4:
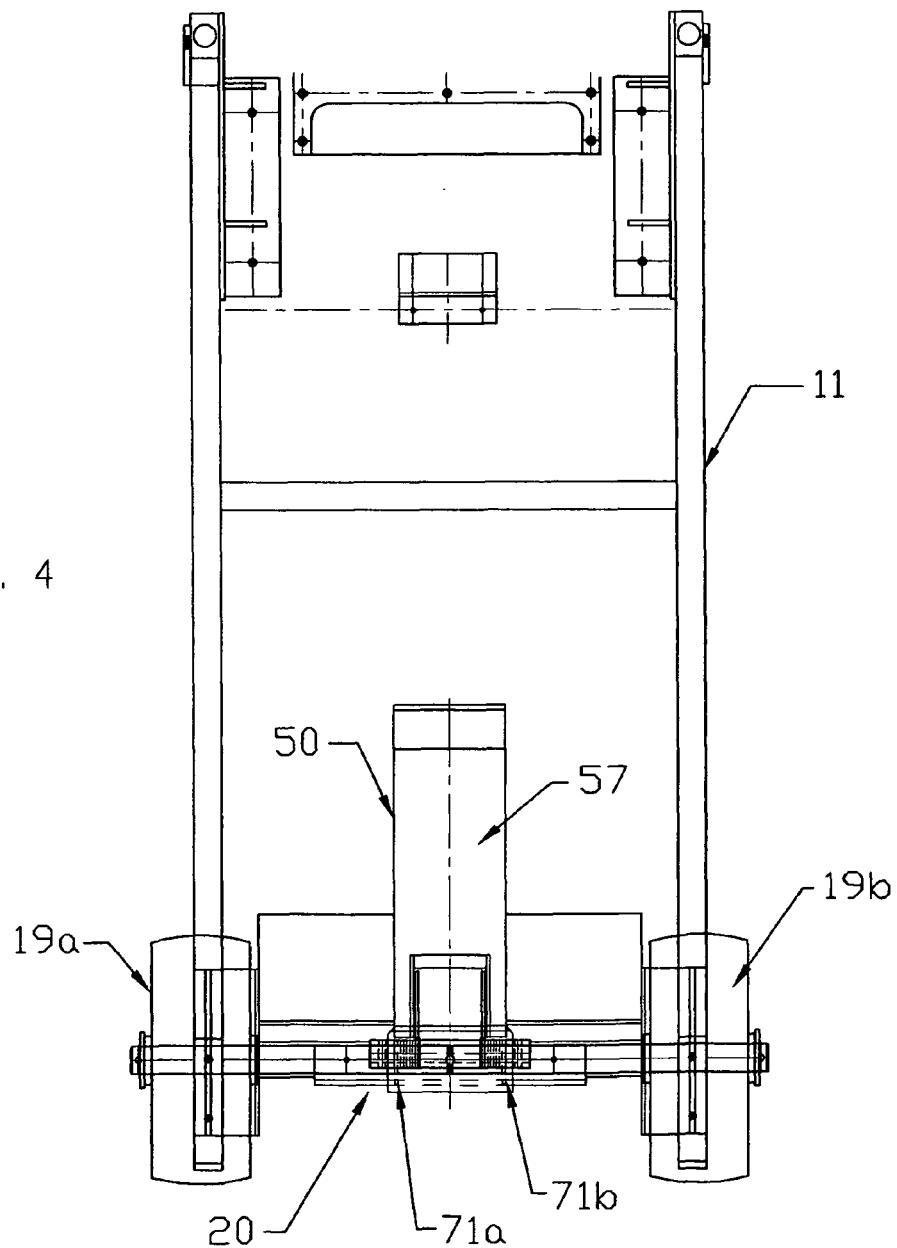
FIG. 4 is a rear view of the first embodiment shown mounted on the transport dolly.
Figure 5:
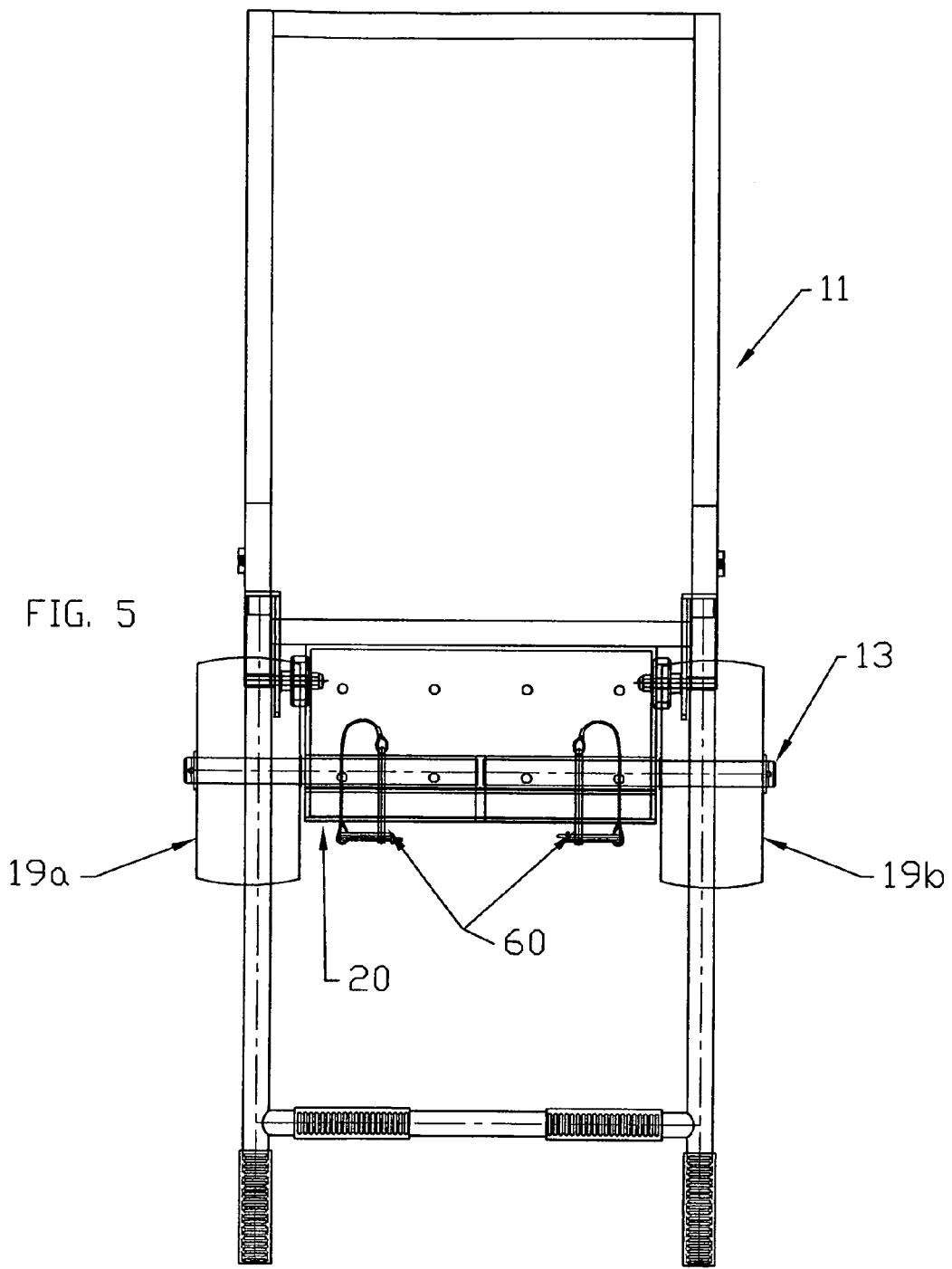
FIG. 5 is a top view of the first embodiment shown mounted on the transport dolly with portions removed for clarity; and, FIG. 6 is a side schematic of the first embodiment shown being used with a loaded storage rack.
Figure 6:
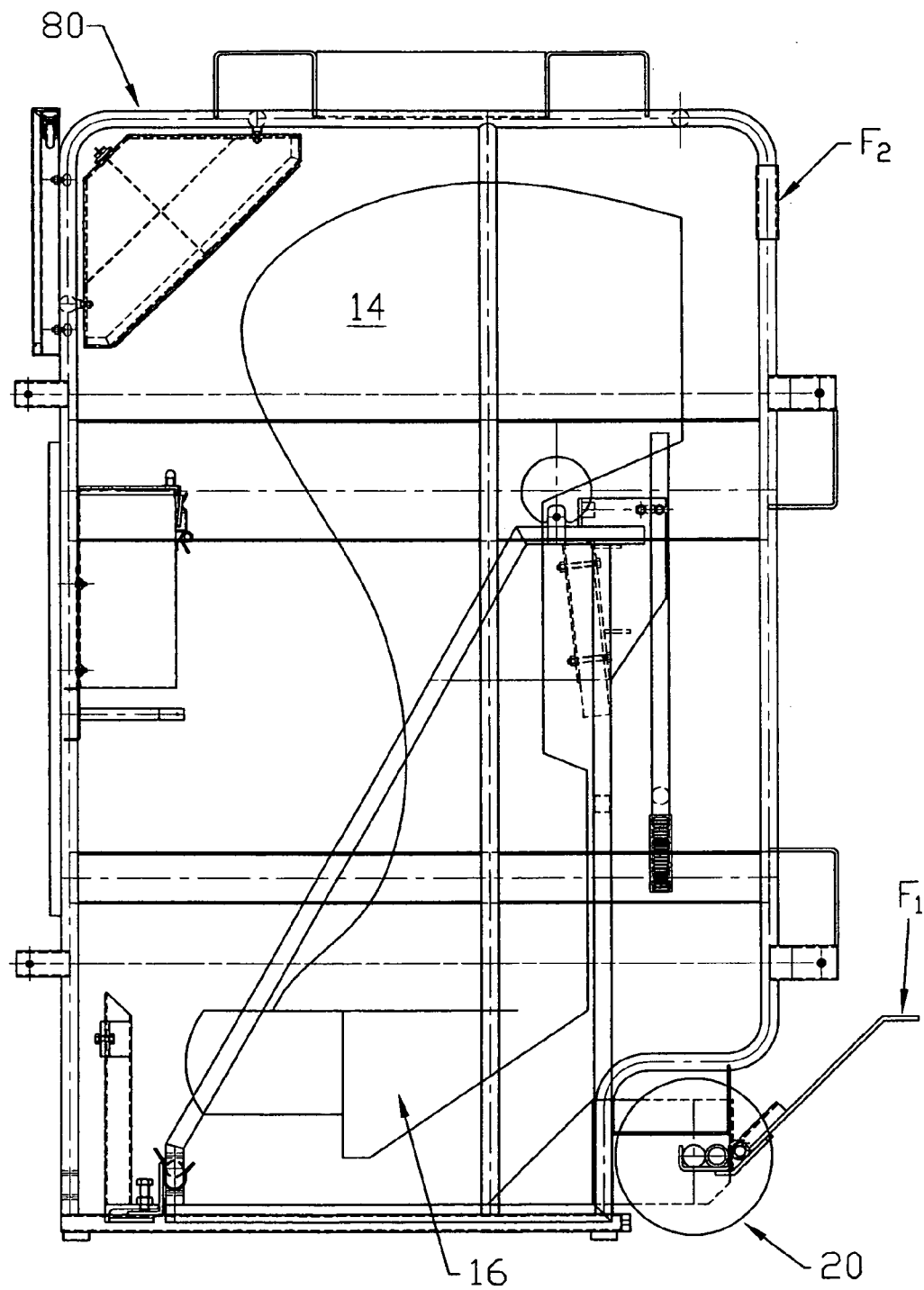

Transport dolly 11 has a latching arm 12 with a first locked position 12A securing dolly 11 in storage rack 80 and a release position 12B (FIG. 3). When loaded with outboard motors 14, storage racks 80 may be repositioned longitudinally and stacked as many as 3 high for shipping. Upon arrival, the transport dolly 11 may be dislodged from the storage rack 80 by swinging latching arm 12 to its release position. By removing cotter pins 60 (FIG. 4) wheels 19a, 19b can be moved to the second axle position 15 which provides greater stability for the dolly 11 when the motor 14 is rotated about a horizontal axis to provide access to the lower end 16 of the unit.

Table I reflects the capabilities of lever assist assembly 20 in accomplishing its objective of facilitating rotating dolly 11 and its load 14 onto wheels 19a, 19b for transit. As shown therein, a 120 lb. person is capable of rotating dolly 11 and its load (which may weigh as much as 350 lb.) 14, if s/he is able to exert a force of 60 lbf draw $F_2$ by standing on foot pedal 58. If the user is able to exert 165 lbf $F_1$ (i.e., if s/he weighs at least that much), the draw force $F_2$ required to tilt the load is reduced to 50 lbf. Finally, if the user is able to exert a downward force of 175 lbf, the draw force $F_2$ is reduced to 45 lbf. Further, the draw angle δ is reduced from 2.5° to less than 1°. This simply means that the maximum force $F_2$ required is at the point of initialization of movement (when the user expects it and is ready to handle it) rather than part way into load engagement where it could catch her/him off guard.

Various changes, alternatives, and modifications will become apparent to a person of ordinary skill in the art after a reading of the foregoing specification. It is intended that all such changes, alternatives, and modifications as fall within the scope of the appended claims be considered part of the present invention.

TABLE I

| Downward Force $F_1$ (lbf) | Draw Force $F_2$ (lbf) | Angle δ of Max. $F_2$ |
|---|---|---|
| 0 | 95 | 2.5° |
| 120 | 60 | 0.7° |
| 165 | 50 | 0.4° |
| 175 | 45 | 0.1° |

We claim:

1. A lever assist device for a transport dolly having handles requiring a specific draw force for a specific load weight, said device comprising:
   a) a base plate assembly for securement to an axle of the transport dolly;
   b) a tilt plate securely affixed to a portion of said base plate;
   c) a lever arm pivotally secured to said base plate assembly and having a first end portion overlapping said tilt plate, and a second end portion with a foot pedal;
   d) attachment means for securing said base plate assembly to the axle of the transport dolly;
   e) an axle pin attached to said base plate assembly, said lever arm being pivotally secured to said base plate assembly by means of said axle pin;
   whereby said foot pedal may be engaged by a foot of the user to pivot said lever arm downwardly into contact with said tilt plate enabling rotation of said tilt plate and the transport dolly attached thereto about the axle of the transport dolly with a significantly reduced level of draw force for the specific load weight.

2. The lever assist device of claim 1 further comprising spring means associated with said axle pin to bias said lever arm to a first non-operative position.

3. The lever assist device of claim 2 wherein said spring means comprises a pair of coil springs wrapped around said axle pin operative between said tilt plate and said lever arm to bias said lever arm into said first non-operative position.

4. The lever assist device of claim 3 wherein said foot pedal comprises said second end of said lever arm bent at a 45° relative to a remaining portion of said lever arm and engagable by the foot of the user to overcome said bias of said coil springs to bring said first end portion overlapping said tilt plate into contact with said tilt plate to allow application of a level of force up to the full weight of the user to assist in rotating the transport dolly about its axle to enable movement of the dolly and its load.

5. The lever assist device of claim 1 further comprising means to attach said base plate to the axle of the transport dolly.

6. The lever assist device of claim 5 wherein said means to attach comprises two pair of aligned holes in said base plate assembly, two holes in the axle, and a pair of cotter pins which extend through said aligned holes on either side of the holes in the axle.

7. The lever assist device of claim 6 wherein the axle comprises a pair of aligned axle shafts upon which wheels may alternatively be mounted.

* * * * *